(12) United States Patent
Zanaglio et al.

(10) Patent No.: US 11,969,737 B2
(45) Date of Patent: Apr. 30, 2024

(54) PLANT FOR SHREDDING METAL WASTE AND A METHOD FOR THE USE THEREOF

(71) Applicant: ZATO SRL, Prevalle (IT)

(72) Inventors: Valerio Zanaglio, Nuvolento (IT); Michele Grazioli, Soncino (IT)

(*) Notice: Subject to any disclaimer, the term of this patent is extended or adjusted under 35 U.S.C. 154(b) by 284 days.

(21) Appl. No.: 17/641,560

(22) PCT Filed: Sep. 1, 2020

(86) PCT No.: PCT/IB2020/058126
§ 371 (c)(1),
(2) Date: Mar. 9, 2022

(87) PCT Pub. No.: WO2021/048685
PCT Pub. Date: Mar. 18, 2021

(65) Prior Publication Data
US 2022/0297134 A1    Sep. 22, 2022

(30) Foreign Application Priority Data
Sep. 13, 2019   (IT) .......................... 102019000016316

(51) Int. Cl.
*B02C 19/00*    (2006.01)
*B02C 13/26*    (2006.01)
(Continued)

(52) U.S. Cl.
CPC .......... *B02C 19/0062* (2013.01); *B02C 13/26* (2013.01); *B02C 25/00* (2013.01); *G05B 23/024* (2013.01); *B02C 2201/06* (2013.01)

(58) Field of Classification Search
CPC ............ B02C 18/0084; B02C 2210/01; B02C 19/0062; B02C 18/00; B02C 18/06; B02C 18/16; B02C 25/00; B02C 13/26
See application file for complete search history.

(56) References Cited

U.S. PATENT DOCUMENTS

| 4,084,752 A | * | 4/1978 | Hagiwara | ............. | B02C 13/095 241/241 |
| 7,182,283 B1 | * | 2/2007 | Santucci | ................. | B02C 15/06 241/117 |

(Continued)

FOREIGN PATENT DOCUMENTS

| WO | 02080043 | 10/2002 |
| WO | 2014187824 | 11/2014 |

*Primary Examiner* — Bobby Yeonjin Kim
(74) *Attorney, Agent, or Firm* — Themis Law

(57) ABSTRACT

A plant for shredding metal waste, comprising at least one working chamber, means for shredding metal waste and motor means operatively connected to the shredding means. The plant further comprising sensor means operatively associated with the motor means and/or shredding means for monitoring at predetermined time intervals at least one working parameter connected to the wear thereof, and at least one data processing unit operatively connected to the sensor means. The data processing unit including: data storage means for storing for a predetermined period of time the values of said at least one working parameter detected by said sensor means and an an artificial intelligence software program so as to allow the plant manager to plan the maintenance of the motor means and/or shredding means.

9 Claims, 1 Drawing Sheet

(51) Int. Cl.
*B02C 25/00* (2006.01)
*G05B 23/02* (2006.01)

(56) References Cited

U.S. PATENT DOCUMENTS

2019/0275529 A1* 9/2019 Manzanares Mercero .................. B02C 23/38
2020/0122156 A1* 4/2020 Saxena .................. G01B 17/02

* cited by examiner

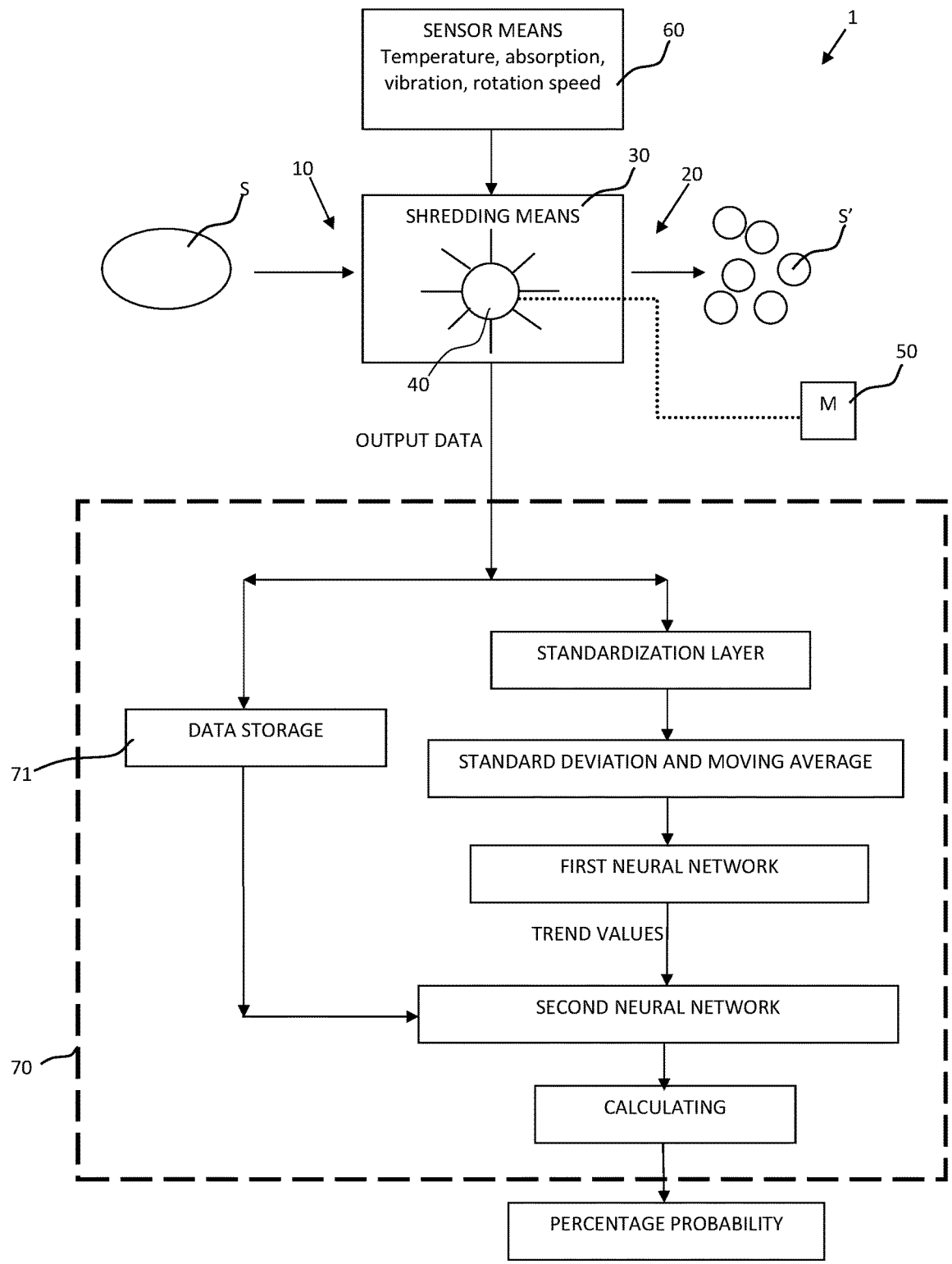

PLANT FOR SHREDDING METAL WASTE AND A METHOD FOR THE USE THEREOF

FIELD OF THE INVENTION

The present invention generally relates to the technical field of plant engineering and it particularly has as object a plant for shredding metal waste and a method for the use thereof.

The present invention also involves a system for planning the maintenance of such plant.

Background of the Invention

In plants for shredding traditional waste, reactive or "breakdown" maintenance is generally performed, which involves technical intervention as a consequence of a malfunction report and, therefore, after failure.

This type of maintenance involves very high costs both in terms of non-production and for the repair of the machinery itself.

On the other hand, in these types of plants, the so-called preventive maintenance is performed, which consists of a series of interventions scheduled at regular time intervals in order to reduce the probability of failures.

Also in this case, maintenance is expensive, since it involves the repetition of interventions regardless of the knowledge of the conditions of the machinery, and the use of resources that could be saved.

SUMMARY OF THE INVENTION

Object of the present invention is to overcome, at least partially, the drawbacks illustrated above, by providing a plant for shredding metal waste being extremely efficient and relatively cost-effective.

Object of the present invention is to provide a plant for shredding metal waste having minimal maintenance costs and times.

Another object of the present invention is to provide a plant for shredding metal waste having a long service life and durability.

Such objects, as well as others that will be clearer hereinafter, are fulfilled by what is herein described, shown and/or claimed.

The dependent claims define advantageous embodiments of the invention.

BRIEF DESCRIPTION OF THE DRAWINGS

Further features and advantages of the present invention will become more evident by reading the detailed description of a preferred but not exclusive embodiment of the plant 1 illustrated as a non-limiting example, with the help of the annexed drawing:

FIG. 1 illustrates a scheme of the plant 1.

DETAILED DESCRIPTION OF A REFERRED EMBODIMENT

With reference to the above mentioned FIGURE, it is here described a plant 1 for shredding metal waste.

In a per se known manner, such plant 1 comprises:
one inlet 10 for metal waste to be shredded S;
one outlet 20 for shredded metal waste S';
one working chamber 30 interposed between the inlet 10 and the outlet 20;
means for shredding metal waste 40 of a per se known type placed in the working chamber 30; and
motor means 50, such as a diesel engine or an electric motor, operatively connected with the shredding means 40.

In order to predict the probability of damage of the shredding means 40 and/or of the engine/motor 50 and allow the plant operator to plan the maintenance of the same during the machine downtime, it may be possible to provide a system including:
sensor means 60 operatively associated to the motor means 50 and/or to said shredding means 40 for monitoring of at least one working parameter at predetermined time intervals; and
at least one data processing unit 70 operatively connected to the sensor means 60.

The parameter monitored by the sensor means 60 may be any, as long as it is directly or indirectly linked to the wear of the shredding means 40 and/or the motor means 50.

For example, the sensor means may comprise one or more sensors operatively associated with the motor means 50 for monitoring the energy absorption of such motor means at predetermined time intervals.

In addition or alternatively, the sensor means may advantageously comprise one or more sensors operatively associated with the motor means for monitoring the temperature of such motor means at predetermined time intervals.

In addition or alternatively, the sensor means may suitably include one or more sensors operatively associated to an axis of rotation of the shredding means for monitoring the vibration thereof at predetermined time intervals.

In addition or alternatively, the sensor means may suitably include one or more sensors operatively associated to a rotation axis of the shredding means for monitoring the rotation speed of the same axis of rotation at predetermined time intervals.

In the event of wear, the above parameters may vary.

The data processing unit, which may for example be a programmable logic controller (PLC) of the plant or a workstation located remotely from the plant, may include data storage means 71 in order to store for a period of predetermined time the values of one or more of the above working parameters and an artificial intelligence software program, which includes the instructions for carrying out the following steps:
calculating, on the basis of said stored values in the data storage means 71, the standard deviation and the moving average thereof;
processing through a first neural network, on the basis of the standard deviation and of the calculated moving average, a trend prediction value of the above mentioned working parameter in a predetermined prediction time period; and
calculating through a second neural network, on the basis of the stored values and of the trend value, the damage percentage probability value of the motor means 50 and/or of the shredding means 40 during the above-mentioned prediction time period;

Thanks to what mentioned above, the plant manager may be able to plan the maintenance of said motor means and/or said shredding means during the closure times of the plant itself if said damage percentage probability value calculated by the artificial intelligence software is above a predetermined threshold value.

More precisely, the artificial intelligence software consists of a multi-layer neural network with a recursive structure. This software uses as input data the values—received on historical series—coming from the sensor means 60 (connected to the input layer with a ratio of 1:1 neuron-sensor). The collected data are processed by a normalization layer that allows to obtain, even on large volumes, essential statistical parameters such as the above mentioned moving average and the standard deviation. Such statistical information in the ratio>=2 for each sensor is sent to the first neural network using an auxiliary input layer that directly connects to the second hidden layer of the software.

Therefore, the first neural network makes a prediction, and the shorter the prediction time period is, the more accurate the prediction itself will be.

At this point, the generated trend values are transferred to the second neural network with classifier functions (with multi-layer structure based on deep learning levels) which has the task of elaborating a binary classification for each of the components of the motor means 50 and/or the shredding means 40 with respect to the breaking of the same in the period of time considered. The software output is a percentage value with respect to the probability of failure.

Being the possibilities of failure of the machinery potentially unlimited, the training of the second model is not done only on a maintenance/failure history, but it is done also including the standard deviation with respect to the expected moving average as an error minimization function. This allows to identify correlations between the sensors' outlier values (or linear or non-linear combinations of the same) with the probability of failure.

From what described above, it is clear that the invention reaches the intended purposes.

The invention is susceptible to numerous modifications and changes. All the details may be replaced by other technically equivalent elements, and the materials may be different depending on requirements, without departing from the scope of the invention defined in the appended claims.

The invention claimed is:

1. A plant for shredding metal waste, comprising:
    at least one inlet for metal waste to be shredded;
    at least one outlet for shredded metal waste;
    at least one working chamber interposed between said at least one inlet and said at least one outlet;
    shredding means for shredding the metal waste placed in said working chamber;
    motor means operatively connected with said shredding means;
    sensor means operatively associated to said motor means and/or to said shredding means for monitoring at predetermined time intervals at least one working parameter connected to a wear of said motor means and/or of said shredding means; and
    at least one data processing unit operatively connected to said sensor means, said at least one data processing unit including:
    data storage means for storing, for a predetermined period of time, the values of said at least one working parameter detected by said sensor means; and
    an artificial intelligence software program that includes instructions to carry out the following steps:
    calculating, based on said stored values, a standard deviation and a moving average thereof;
    processing, based on the standard deviation and the calculated moving average, a trend prediction value of said at least one working parameter in a predetermined prediction time period; and
    calculating, based on said stored values and said trend value, a damage percentage probability value of said motor means and/or of said shredding means in said predetermined prediction time period;
    so as to allow a plant manager to plan the maintenance of said motor means and/or of said shredding means during closure times of the same plant if said damage percentage probability value is above a predetermined threshold value.

2. Plant according to claim 1, wherein said sensor means comprise at least one first sensor operatively associated with said motor means for monitoring within a first predetermined time span an energy absorption of said motor means.

3. Plant according to claim 1, wherein said sensor means comprise at least one second sensor operatively associated with said motor means for monitoring within a second predetermined time span a temperature of said motor means.

4. Plant according to claim 3, wherein said shredding means includes at least one rotation shaft, said sensor means comprising at least one third sensor operatively associated with said at least one rotation shaft for monitoring within a third predetermined time span a vibration of said at least one rotation shaft.

5. Plant according to claim 3, wherein said shredding means include at least one rotation shaft, the sensor means comprising at least one fourth sensor operatively associated with said at least one rotation shaft for monitoring within a fourth predetermined time span a rotation speed of said at least one rotation shaft.

6. Plant according to claim 1, wherein said step of processing said prediction value is carried out by a first neural network.

7. Plant according to claim 1, wherein said step of calculating said damage percentage probability value is carried out by a second neural network.

8. A method for using a metal waste shredding plant according to claim 1, comprising the steps of:
    shredding metal waste for a first predetermined time period;
    switching off the metal waste shredding plant for a second predetermined time period; and
    maintaining said motor means and/or of said shredding means during said second predetermined time period;
    wherein said step of maintaining is carried out only if said damage percentage probability value is above a predetermined threshold value.

9. A system for planning the maintenance of a plant for shredding metal waste, the plant comprising:
    at least one inlet for metal waste to be shredded;
    at least one outlet for shredded metal waste;
    at least one working chamber interposed between said at least one inlet and said at least one outlet;
    shredding means for shredding said metal waste placed in said working chamber; and
    motor means operatively connected with said shredding means;
    wherein the system further includes:
    sensor means operatively associated with said motor means and/or with said shredding means for monitoring within a predetermined time span at least one working parameter connected to a wear of said motor means and/or of said shredding means; and
    at least one data processing unit operatively connected to said sensor means, said at least one data processing unit including:
    data storage means for storing for a predetermined period of time the values of said at least one working parameter detected by said sensor means; and an artificial intelligence software program that includes instructions to carry out the following steps:

calculating, based on said stored values, a standard deviation and a moving average thereof;

processing, based on the calculated standard deviation and moving average, a trend prediction value of said at least one working parameter in a predetermined prediction time period; and calculating, based on said stored values and said trend value, a damage percentage probability value of said motor means and/or of said shredding means in said predetermined prediction time period;

so as to allow a plant manager to plan the maintenance of said motor means and/or of said shredding means during closure times of the system if said damage percentage probability value is above a predetermined threshold value.

* * * * *